(12) United States Patent
Yue et al.

(10) Patent No.: US 11,558,364 B2
(45) Date of Patent: Jan. 17, 2023

(54) AUTHENTICATION OFFLOAD IN VIRTUALIZED COMPUTING ENVIRONMENTS

(71) Applicant: Nicira, Inc., Palo Alto, CA (US)

(72) Inventors: Hong Yue, Beijing (CN); Changyan Chi, Beijing (CN); Wen Wang, Beijing (CN); Yao Zhang, Beijing (CN); Wenping Fan, Beijing (CN); Xiansheng Yu, Beijing (CN)

(73) Assignee: NICIRA, INC., Palo Alto, CA (US)

( * ) Notice: Subject to any disclaimer, the term of this patent is extended or adjusted under 35 U.S.C. 154(b) by 115 days.

(21) Appl. No.: 15/652,330

(22) Filed: Jul. 18, 2017

(65) Prior Publication Data

US 2019/0028455 A1 Jan. 24, 2019

(51) Int. Cl.
*H04L 9/40* (2022.01)
*G06F 9/455* (2018.01)
*G06F 21/44* (2013.01)

(52) U.S. Cl.
CPC ........ *H04L 63/083* (2013.01); *G06F 9/45558* (2013.01); *G06F 21/44* (2013.01); *H04L 63/0853* (2013.01); *H04L 63/0884* (2013.01); *G06F 2009/45587* (2013.01)

(58) Field of Classification Search
CPC ............... H04L 63/083; H04L 63/0853; G06F 9/45558; G06F 21/30; G06F 2009/45587
USPC .......................................................... 726/7
See application file for complete search history.

(56) References Cited

U.S. PATENT DOCUMENTS

| | | | |
|---|---|---|---|
| 8,838,961 B2* | 9/2014 | Zarfoss, III | G06F 21/335 713/155 |
| 8,856,869 B1* | 10/2014 | Brinskelle | G06F 21/6218 726/2 |
| 10,382,195 B2* | 8/2019 | Brandwine | H04L 9/3247 |
| 10,803,027 B1* | 10/2020 | Rodgers | G06F 16/196 |
| 2013/0018765 A1* | 1/2013 | Fork | H04L 61/2592 705/34 |
| 2014/0006347 A1* | 1/2014 | Qureshi | H04W 4/029 707/621 |
| 2014/0123236 A1* | 5/2014 | Hirata | H04L 63/0807 726/4 |
| 2014/0229615 A1* | 8/2014 | Hsueh | H04L 69/22 709/224 |
| 2015/0086017 A1* | 3/2015 | Taylor | H04L 9/3242 380/270 |
| 2015/0381621 A1* | 12/2015 | Innes | H04L 9/321 726/7 |

(Continued)

*Primary Examiner* — Shewaye Gelagay
*Assistant Examiner* — Moeen Khan
(74) *Attorney, Agent, or Firm* — Su IP Consulting

(57) ABSTRACT

Example methods are provided for a host to perform authentication offload in a virtualized computing environment that includes the host and a destination server. The method may comprise detecting, from a virtualized computing instance, a packet destined for the destination server. The method may also comprise: in response to determination that the detected packet is an authentication request, obtaining, from the virtualized computing instance, metadata associated with a client application for which authentication is requested; and sending the authentication request and the metadata to the destination server to cause the destination server to authenticate the client application based on the metadata.

15 Claims, 5 Drawing Sheets

(56) References Cited

U.S. PATENT DOCUMENTS

| | | | |
|---|---|---|---|
| 2016/0164880 A1* | 6/2016 | Colesa | H04L 63/105 726/1 |
| 2016/0285832 A1* | 9/2016 | Petrov | H04L 63/0428 |
| 2016/0314012 A1* | 10/2016 | Rong | G06F 9/45558 |
| 2016/0380916 A1* | 12/2016 | Gnaneswaran et al. | H04L 47/803 709/224 |
| 2017/0317969 A1* | 11/2017 | Masurekar | H04L 61/2015 |
| 2018/0287883 A1* | 10/2018 | Joshi | G06F 9/455 |
| 2018/0332078 A1* | 11/2018 | Kumar | H04L 63/168 |

* cited by examiner

AUTHENTICATION OFFLOAD IN VIRTUALIZED COMPUTING ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. For example, in practice, a virtual machine may run a client application that requires access to resources or services provided by a remote server. For security reasons, authentication of the client application may be performed to verify whether the client application should be have access to the resources or services. However, conventional authentication approaches may not be suitable for virtualized computing environments.

DETAILED DESCRIPTION

Figure 1:
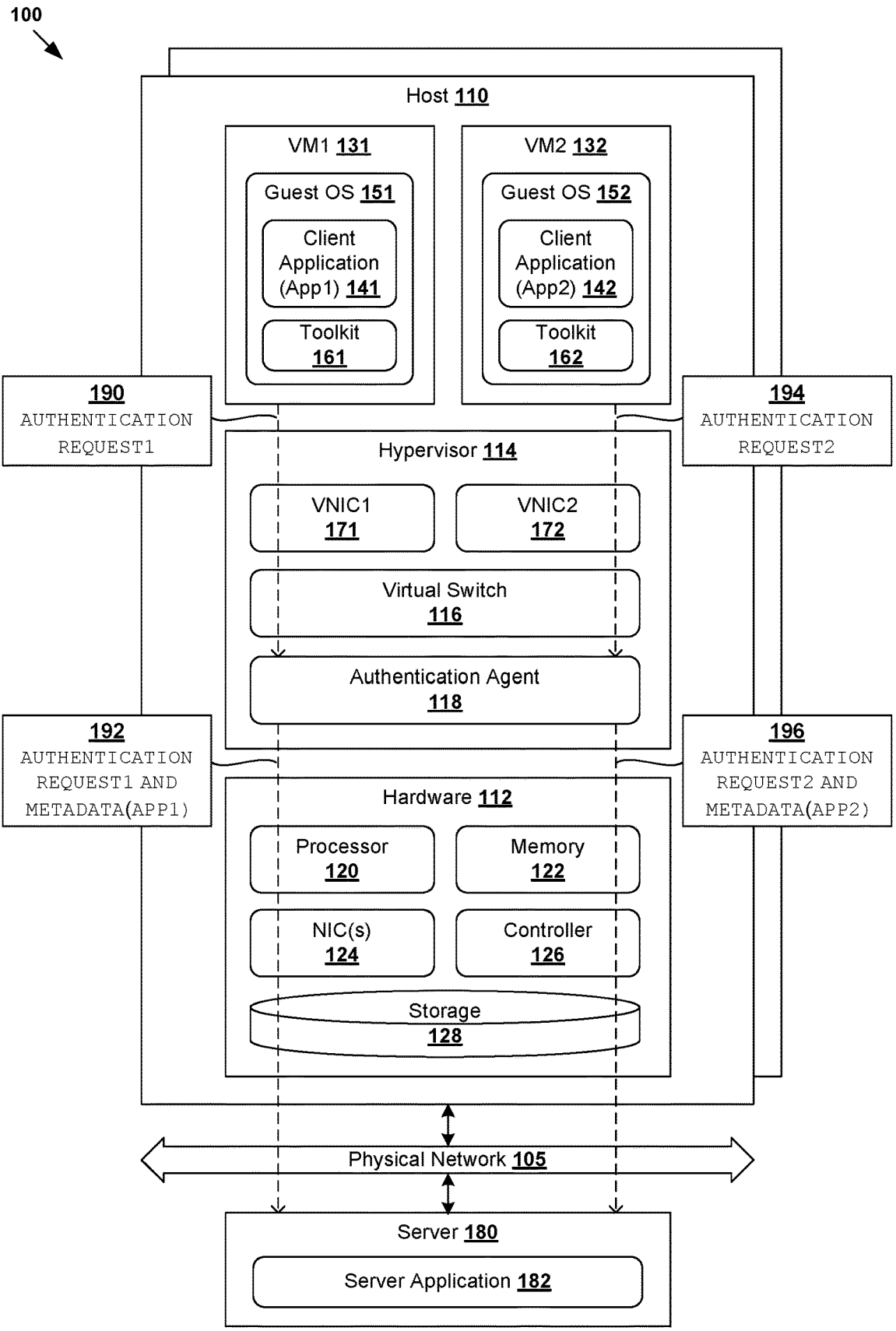
FIG. 1 is a schematic diagram illustrating an example virtualized computing environment in which authentication offload may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to authentication will now be explained in more detail using FIG. 1, which is a schematic diagram illustrating example virtualized computing environment 100 in which authentication offload may be performed. It should be understood that, depending on the desired implementation, network environment 100 may include additional and/or alternative components than that shown in FIG. 1.

In the example in FIG. 1, virtualized computing environment 100 includes multiple hosts 110 (one shown for simplicity) that are inter-connected via physical network 105. Each host 110 includes suitable hardware 112 and virtualization software (e.g., hypervisor 114) to support various virtual machines 131-132. In practice, virtualized computing environment 100 may include any number of hosts, where each host may be supporting tens or hundreds of virtual machines. VM1 131 and VM2 132 each represent a software implementation of a physical machine.

Although examples of the present disclosure refer to virtual machines, it should be understood that a "virtual machine" running on host 110 is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. An application supported by a virtual machine may be a containerized application. The term "hypervisor" may refer generally to a software layer or component that supports the execution of multiple virtualized computing instances, including system-level software in guest virtual machines that supports namespace containers such as Docker, etc.

Hypervisor 114 maintains a mapping between underlying hardware 112 and virtual resources allocated to respective virtual machines 131-132. Hardware 112 includes suitable physical components, such as central processing unit(s) or processor(s) 120; memory 122; physical network interface controllers (NICs) 124; and storage disk(s) 128 accessible via storage controller(s) 126, etc. Virtual resources are allocated to each virtual machine 131/132 to support guest operating system (OS) 151/152 and client application 141/142. Corresponding to hardware 112, the virtual resources may include virtual CPU, virtual memory, virtual disk, virtual network interface controller (VNIC), etc. In the example in FIG. 1, virtual machines 131-132 are associated with respective VNICs 171-172 (also known as virtual Ethernet cards). Although one-to-one relationships are shown, one virtual machine may be associated with multiple VNICs (each VNIC having its own network address).

Hypervisor 114 further implements virtual switch 116 to handle egress packets from, and ingress packets to, respective virtual machines 131-132. The term "packet" may refer generally to a group of bits that can be transported together from a source to a destination, such as message, frame, segment, datagram, etc. For example in FIG. 1, VM1 131 and VM2 132 implement respective client applications 141-142 to access resources or services provided by remote server 180 supporting server application 182. Server 180 may be implemented using a physical machine and/or virtual machine(s). In one example, server 180 may be a virtual machine supported by another host 110 in virtualized computing environment 100.

Authentication may be performed verify whether client application 141/142 should have access to the resources or services provided by server 180. However, conventional approaches for authentication may not be suitable for virtualized computing environment 100. For example, one conventional approach involves a user (e.g., network administrator) manually pairing client application 141/142 with server application 182, and pushing authentication credentials to virtual machine 131/132 supporting client application 141/142. During authentication, client application 141/142 interacts with server 180 to provide the authentication credentials, based on which server 180 may verify the identity of client application 141/142.

However, since it is necessary for client application 141/142 to manage or maintain their own authentication credentials according to the conventional approach, a third party might exploit a vulnerability of virtual machine 131/132, such as guest OS 151/152 and/or client application 141/142, to steal the authentication credentials and launch a malicious attack. A successful attack on one virtual machine may adversely affect the performance and security of other virtual machines in virtualized computing environment 100. This problem is exacerbated in virtualized computing environment 100 where there are hundreds or thousands of virtual machines implementing a large number of client applications.

Authentication Offload

According to examples of the present disclosure, authentication offload may be performed to relieve client application 141/142 from the responsibility of maintaining authentication credentials, and providing the authentication credentials to server 180 during authentication. Instead, the task of interacting with server 180 during an authentication process is "offloaded" or delegated from client application 141/142 to hypervisor 114, which provides better security protection against malicious attacks compared to virtual machine 131/132. In the example in FIG. 1, host 110 may implement authentication agent 118 to manage the authentication of various client applications 141-142 executing on virtual machines 131-132 supported by host 110.

Figure 2:
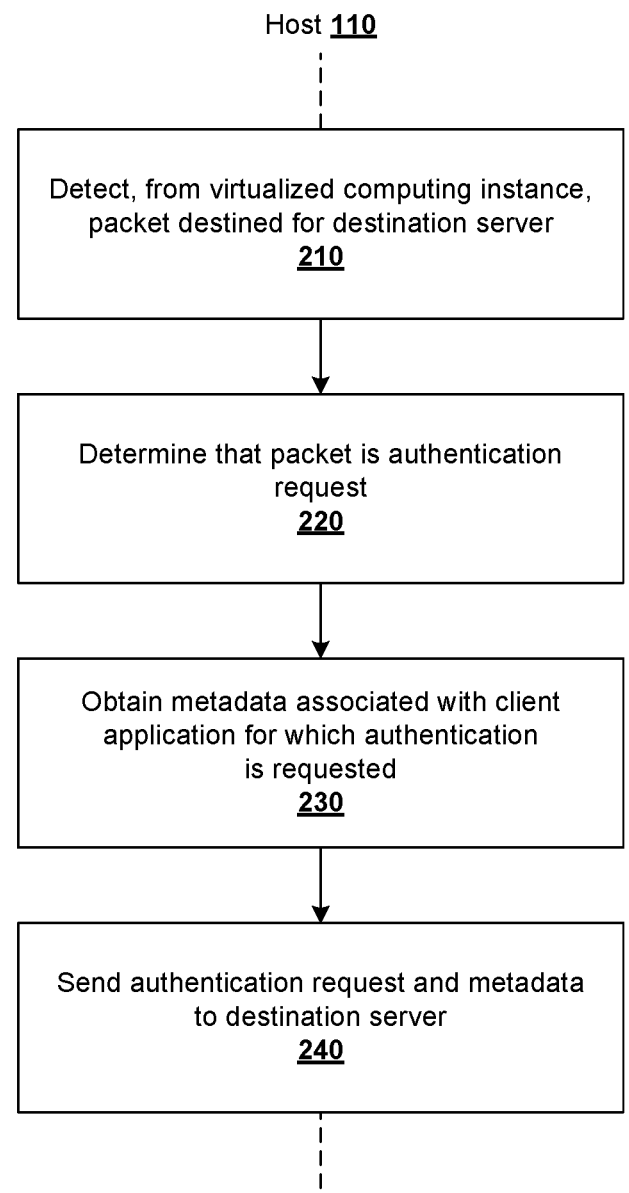
FIG. 2 is a flowchart of an example process for a host to perform authentication offload in a virtualized computing environment.

In more detail, FIG. 2 is a flowchart of example process 200 for host 110 to perform authentication offload in a virtualized computing environment 100. Example process 200 may include one or more operations, functions, or actions illustrated by one or more blocks, such as 210 to 240. The various blocks may be combined into fewer blocks, divided into additional blocks, and/or eliminated depending on the desired implementation. Example process 200 may be performed by host 110, and more particularly, VNIC 171/172 and authentication agent 118 supported by hypervisor 114. Various examples will be explained below using VM1 131 and VM2 132 as example "virtualized computing instances" and server 180 as an example "destination server" performing authentication.

In a first example, according to 210 in FIG. 2, a first packet destined for server 180 is detected from VM1 131 via VNIC1 171. According to 220 and 230, in response to determination that the first packet is an authentication request (see 190 in FIG. 1), metadata associated with first client application 141 for which authentication is requested is obtained from VM1 131. According to 240, the authentication request from VM1 131 and the metadata associated with first client application 141 (see 192 in FIG. 1) are sent to server 180 to cause server 180 to authenticate first client application 141 based on the metadata.

Similarly, in a second example, according to 210 in FIG. 2, a second packet destined for server 180 is detected from VM2 132 via VNIC2 172. According to 220 and 230, in response to determination that the second packet is an authentication request (see 194 in FIG. 1), metadata associated with second client application 142 for which authentication is requested is obtained from VM2 132. According to 240, the authentication request from VM2 132 and the metadata associated with second client application 142 (see 196 in FIG. 1) are sent to server 180 to cause server 180 to authenticate second client application 142 based on the metadata. In practice, the authentication request from VM2 132 may be destined for a different server.

As will be described further below, the term "metadata" associated with client application 141/142 may refer generally to any suitable data based on which authentication may be performed to verify an identity of client application 141/142, such as a hash value and/or a digital signature associated with client application 141/142. The metadata may be obtained from guest OS 151/152 associated with VM 131/132, such as by invoking a call supported by guest enhancement toolkit 161/162. The call may include any suitable header data (e.g., source port number) of the authentication request for guest enhancement toolkit 161/162 to identify client application 141/142. Various examples will be explained below using FIG. 3 to FIG. 5.

Authentication Request

Figure 3:
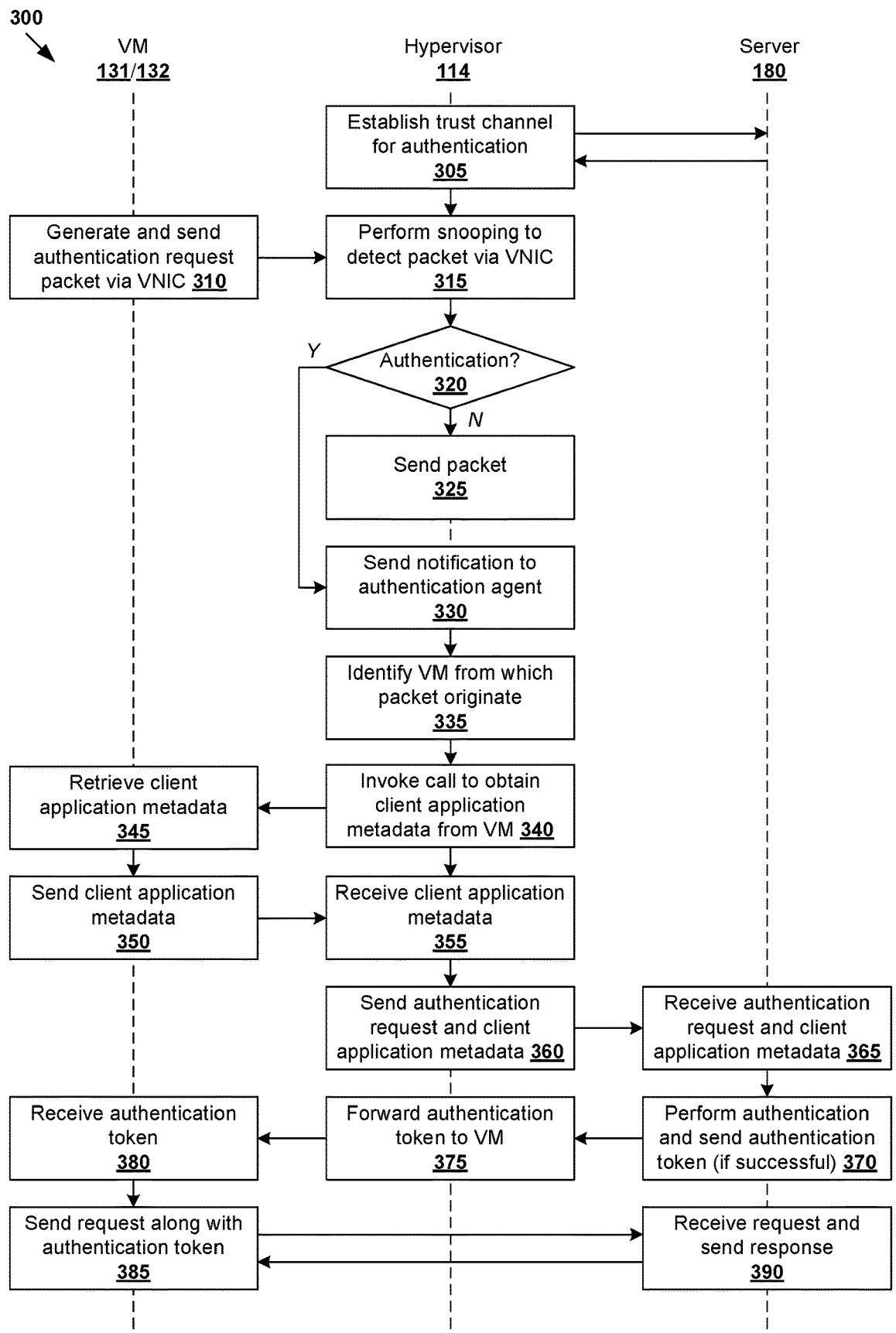
FIG. 3 is a flowchart of an example detailed process for performing authentication offload in a virtualized computing environment.

FIG. 3 is a flowchart of example detailed process 300 for authentication offload in virtualized computing environment 100. Example process 300 may include one or more operations, functions, or actions illustrated by one or more blocks, such as 305 to 390. The various blocks may be combined into fewer blocks, divided into additional blocks, and/or eliminated depending on the desired implementation. As will be described further below, hypervisor 114 may implement example process 300 using VNIC1 171 and authentication agent 118 (may also be referred to as a virtual authenticator). The example in FIG. 3 will be discussed using FIG. 4, which is a schematic diagram illustrating example 400 of authentication offload according to the example in FIG. 3

At 305 in FIG. 3, host 110, or more particularly authentication agent 118, establishes a trust channel with server 180 to facilitate authentication offload. Here, the "trust channel" represents a communication channel over which authentication-related traffic (e.g., authentication requests and responses) may be transmitted between authentication agent 118 and server 180. In the example in FIG. 4, the trust channel (see 405) may be established using any suitable approach, such as bidirectional authentication using any suitable protocol such as transport layer security (TLS), shared secret key, tamper resistant software (TRS), authentication token such as JavaScript Object Notation (JSON) Web Token (JWT), etc.

Once the trust channel or relationship is established, server 180 recognizes authentication agent 118 as a trusted source, and vice versa. The same trust channel may be used to send authentication requests from different client applications 141-142 to server 180. Authentication agent 118 may establish multiple trust channels with different servers. For example, if authentication is required from a second server (not shown), a second trust channel may be established between authentication agent 118 and the second server, etc.

At 310 in FIG. 3, client application 141 executing on VM1 131 generates and sends an authentication request packet destined for server 180. Depending on the desired implementation, the authentication request is generally in plain text and not encrypted. The authentication request may be generated by client application 141 using any suitable protocol, such as Transmission Control Protocol (TCP), HyperText Transfer Protocol (HTTP), HTTP Secure (HTTPS), etc.

Figure 4:
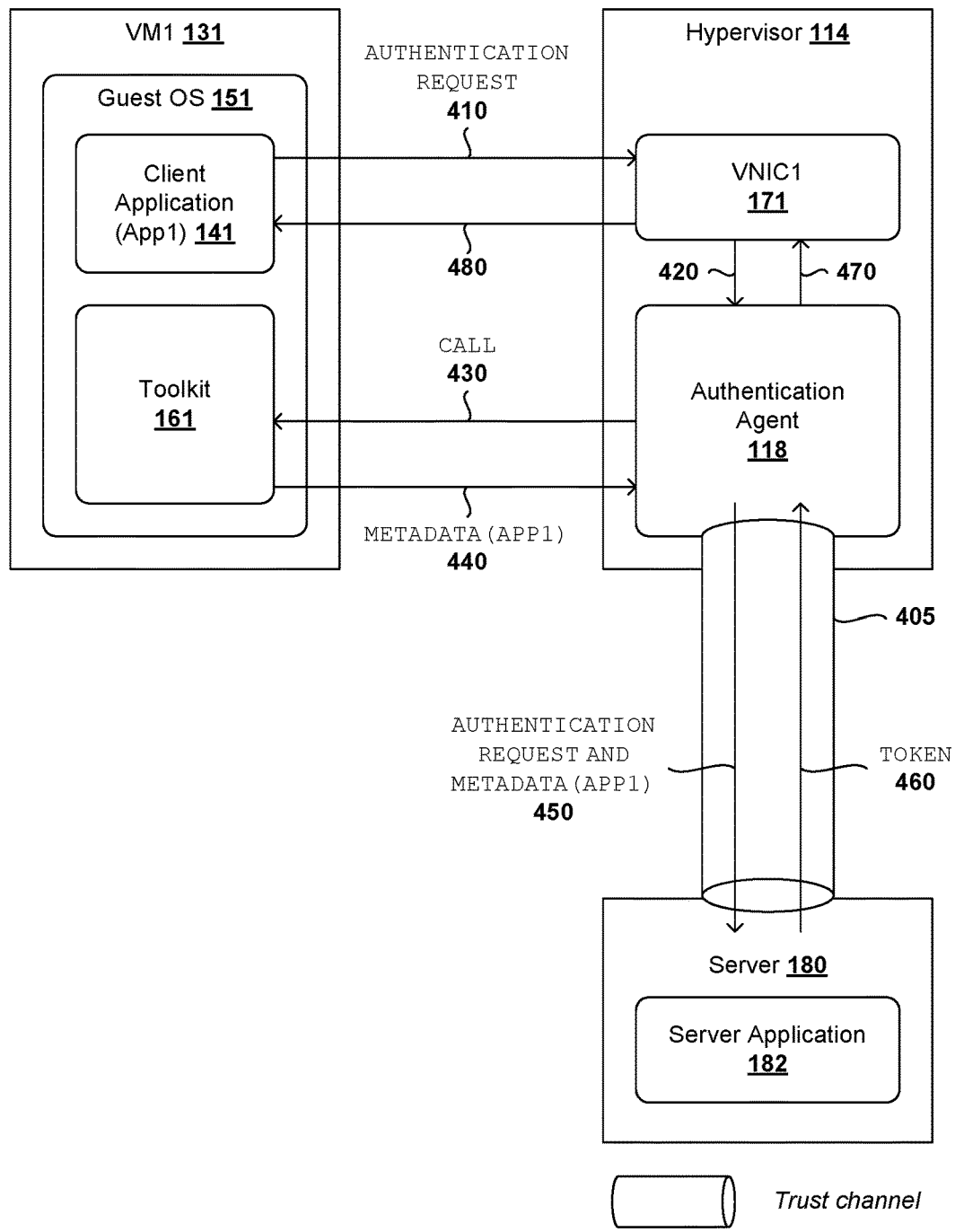
FIG. 4 is a schematic diagram illustrating an example implementation of authentication offload according to the example in FIG. 3.

In the example in FIG. 4, the authentication request (see 410) may be a request to establish a TCP connection with server 180, such as a Synchronization (SYN) packet as part of a three-way handshake. In this case, the authentication request includes header data identifying 5-tuple parameters of the TCP connection: (source IP address, destination IP address, source port number, destination port number, protocol=TCP). Once the TCP connection is established, HTTP requests and responses may be exchanged between client application 141 and server 180 over the TCP connection. The authentication request may also be a HTTP or HTTPS request for a service supported by server 180.

To facilitate authentication offload, hypervisor 114A performs packet snooping at VNIC1 171 and VNIC2 172 to detect any packet from respective VM1 131 and VM2 132. At 315 and 320 in FIG. 3, in response to detecting a packet from VM1 131 via VNIC1 171, it is determined whether the packet is an authentication request. For example, authentication agent 118 may have access to a list of servers (e.g., destination IP addresses) that require authentication. In this case, authentication agent 118 may determine whether the packet is destined for one of the servers on the list based on the header data of the packet (e.g., destination IP address and destination port number). The list may be configured by a user (e.g., network administrator), learned or updated by authentication agent 118 over time, etc.

At 325 in FIG. 3, if the packet detected at 315 is not an authentication request (e.g., the destination does not require authentication), the packet will be sent to its destination. Otherwise (i.e., authentication required), at 330, a notification will be sent from VNIC1 171 to authentication agent 118.

In the example in FIG. 4, in response to detecting the authentication request (see 410), VNIC1 171 may also extract any suitable header data from the authentication request, such as source port number, destination port number, source IP address, destination IP address, etc. In this case, the notification (see 420) sent from VNIC1 171 to authentication agent 118 may include the authentication request, the header data and any additional data identifying VM1 131 (e.g., VNIC ID=VNIC1).

Metadata Associated with Client Application

At 335 and 340 in FIG. 3, authentication agent 118 identifies VM1 131 (e.g., based on VNIC ID=VNIC1), and obtains metadata associated with client application 141 from VM1 131 based on the header data of the authentication request. In the example in FIG. 4, this may involve authentication agent 118 requesting for the metadata from guest OS 151 by invoking a call supported by guest enhancement toolkit 161. For example, the call (see 430) may identify header data of the authentication request, such as the source port number extracted from the authentication request.

In practice, guest enhancement toolkit 161/162 may represent a set of device drivers and services that are generally installed on guest OS 151/152 to boost the performance of guest OS 151/152, facilitate management of VM 131/132, improve the interaction between VM 131/132 and its host 110, etc. One example of guest enhancement toolkit 161/162 is VMware Tools™ available from VMware, Inc. Any other suitable toolkit that supports the call at block 340 may be used in practice.

At 345 in FIG. 3, in response to the call by authentication agent 118, guest enhancement toolkit 161 retrieves the metadata associated with client application 141. For example, since there may be multiple applications (or processes) running on VM1 131, client application 141 may be identified based on the source port number provided in the call.

In example in FIG. 4, the "metadata" (see 440) associated with client application 141 may include any suitable data that allows server 180 to verify an identity of client application 141, such as a (process) hash value associated with client application 141, a digital signature, etc. For example, the hash value may be calculated for client application 141 using any suitable hash function, such as Secure Hash Algorithm (SHA), Message Digest (MD), variants thereof, etc. Depending on the desired implementation, the hash value may be calculated using MD5, SHA-1 or SHA-256, etc. An input of the hash function may include binary content associated with client application 141. The hash value may be used by server 180 to identify client application 141 and/or to check that its binary content is unchanged.

Additionally or alternatively, the digital signature (also known as application signing information) associated with client application 141 may be generated any suitable digital signature function, such as RSA-based algorithms, Digital Signature Algorithm (DSA) and its elliptic curve variants, etc. The hash value and digital signature may be calculated when client application 141 is installed on VM1 131. Depending on the desired implementation, the metadata may be static data that is updated when authentication agent 118 is updated. The update may be initiated by a user (e.g., network administrator) and managed at a hypervisor level.

In practice, a kernel-mode device driver (not shown) in guest enhancement toolkit 161 may be used to facilitate communication between guest OS 151 and authentication agent 118. For security purposes, such as to avoid or reduce the likelihood of data forgery, access control of the device driver may be configured to allow access by those with privileged rights only (e.g., local system in Windows OS, etc.). In this case, a data collection program in guest enhancement toolkit 161 may be run with privileged right so that data is only sent to the device driver. Access by non-privileged users or processes will be forbidden. This way, a malicious process without the required privileged right will not be able to send fake or forged data to the device driver.

At 350, 355 and 360 in FIG. 3, in response to receiving the metadata from guest enhancement toolkit 161 of guest OS 151, authentication agent 118 sends the authentication request from VM1 131 and the metadata to server 180. As shown in the example in FIG. 4, the authentication request from VM1 131 and metadata (see 450) are sent via the trust channel (see 405) established between authentication agent 118 and server 180 at block 305 in FIG. 3. For example, header data of the authentication request may be modified to include the metadata. In the case of HTTPS request, the metadata may be included in JSON format in the header of the HTTPS request, which will be sent over the trust channel established based on TLS bi-directional authentication, JWT token, etc.

Authentication

At 365 in FIG. 3, in response to receiving the authentication request and metadata, server 180 performs authentication to verify an identity of client application 141 based on metadata. For example, if the metadata includes a hash value associated with client application 141, server 180 verifies whether the hash value is correct, such as to ensure that its binary content is unchanged. Additionally or alternatively, the authentication may be based on a digital signature associated with client application 141.

At 370 in FIG. 3, in response to determination that authentication is successful, server 180 sends a response that includes an authentication token to authentication agent 118. Otherwise (not shown for simplicity), a failed notification will be sent from server 180 to authentication agent 118. At 375 and 380, authentication agent 118 receives and forwards the authentication token to VM1 131.

In the example in FIG. 4, the authentication token (see 460) is sent to authentication agent 118 via the trust channel (see 405) between them. Authentication agent 118 then forwards the authentication token to VM1 131 via VNIC1 171 (see 470 and 480). Here, the term "authentication token" (also known as a security token or access token) may refer generally to any suitable data that indicates that client application 141 has an authenticated or trusted relationship with server 180.

Client-Server Communication

At 385 and 390 in FIG. 3, client application 141 may use the authentication token for subsequent client-server communication with server application 182 supported by server 180. An example will be described using FIG. 5, which is a schematic diagram illustrating example communication 500 between client application 141 and server application 182 after authentication is performed according to the example in FIG. 3.

Figure 5:
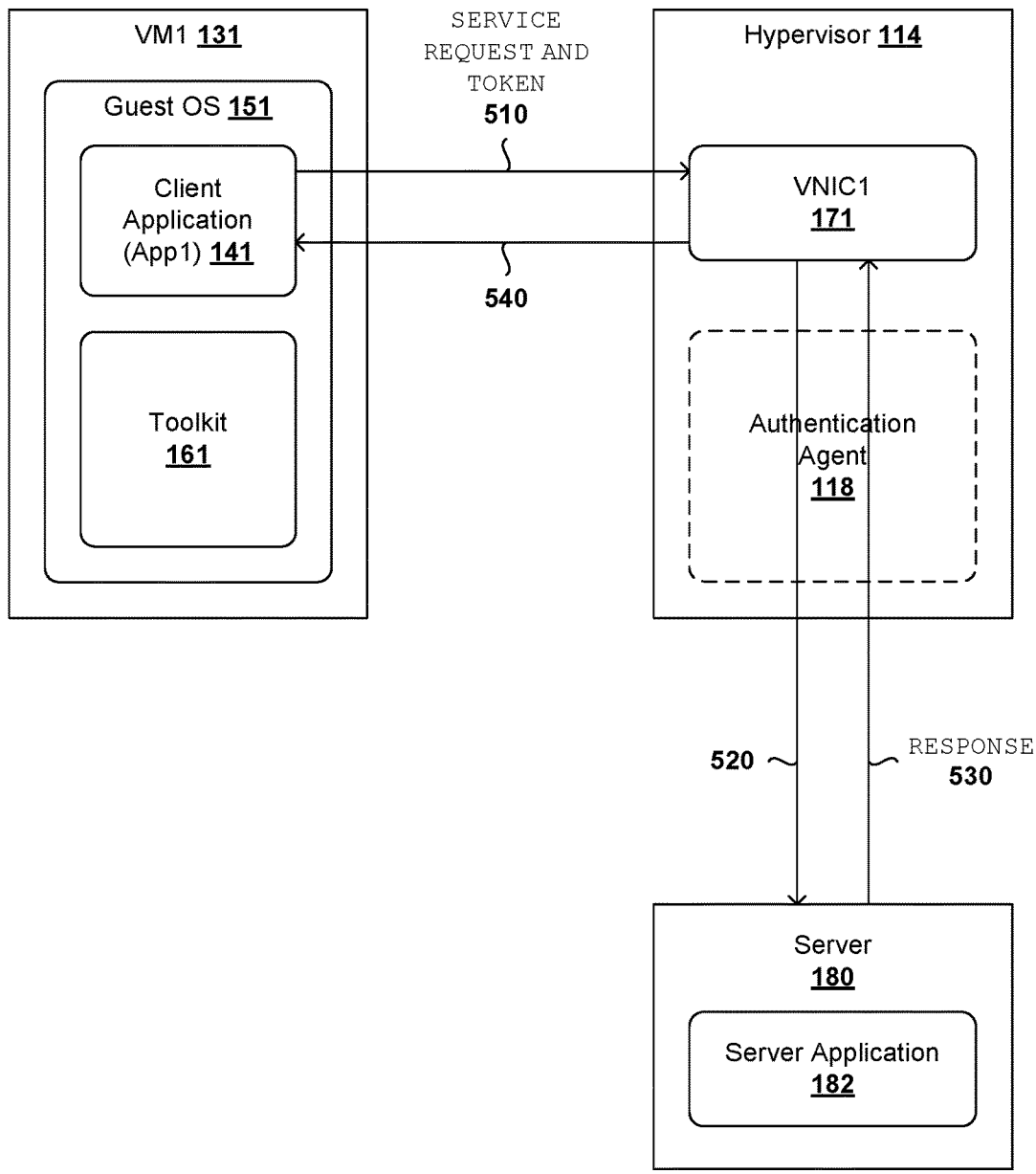
FIG. 5 is a schematic diagram illustrating example communication between a client application and a server application after authentication is performed according to the example in FIG. 3.

In the example in FIG. 5, client application 141 generates and sends a HTTP request to request for a service provided by server application 182. The HTTP request (i.e. service request) and the authentication token are then sent via VNIC1 171 to server 180 (see 510 and 520). Server application 182 then processes the HTTP request and sends a HTTP response providing the requested service to client application 141 (see 530 and 540).

Note that authentication agent 118 is shown in dashed line in FIG. 6 to indicate that the communication between client application 141 and server application 182 is conducted without any involvement by authentication agent 118. In practice, parameters relating to a connection or session (e.g., TCP) between client application 141 and server application 182 may be stored at VNIC1 171 such that blocks 315 to 360 are not performed packets destined for server 180 after authentication. This reduces any adverse performance impact relating to packet snooping or filtering.

Although explained using client application 141 at VM1 131, it should be understood that example process 300 may be implemented to authenticate client application 142 at VM2 132. An authentication request from VM2 132 may be destined for server 180, or any other destination. This way, authentication agent 118 is able to facilitate the authentication of various client applications executing on multiple virtual machines supported by host 110, without necessitating the client applications to maintain their own authentication credentials.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 5. For example, a computer system may be deployed in virtualized computing environment 100 to perform the functionality of host 110 or server 180.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host including virtualization software to perform authentication offload in a virtualized computing environment that includes the host and a destination server, wherein the method comprises:

detecting, by the virtualization software, a packet from a virtualized computing instance and destined for the destination server at a virtual network interface controller (VNIC) associated with the virtualized computing instance, wherein the virtualized computing instance is one of multiple virtualized computing instances supported by the host, and the virtualization software maintains a mapping between underlying hardware resources of the host and virtual resources allocated to the virtualized computing instance;

in response to determination that the detected packet is an authentication request generated by a client application supported by the virtualized computing instance, obtaining, by the virtualization software from the virtualized computing instance, metadata associated with the client application for which authentication is requested, wherein the obtaining comprises based on header data of the authentication request, requesting the metadata from a guest operating system (OS) associated with the virtualized computing instance, and invoking a call supported by a guest enhancement toolkit installed on the guest OS, wherein the call identifies a source port number included in the authentication request, and the guest enhancement toolkit uses the source port number to identify the client application; and sending, by the virtualization software the authentication request and the metadata to the destination server to cause the destination server to authenticate the client application based on the metadata; and in response to determination that the detected packet is not the authentication request, sending the detected packet to the destination server.

2. The method of claim 1, wherein obtaining the metadata comprises:

receiving, from the guest enhancement toolkit, the metadata that includes one or more of the following: a hash value associated with the client application and a digital signature associated with the client application.

3. The method of claim 1, wherein detecting the packet comprises:

performing packet snooping at the virtual network interface controller (VNIC) associated with the virtualized computing instance.

4. The method of claim 1, wherein the method further comprises:

establishing a trust channel between an authentication agent supported by the host and the destination server, wherein the trust channel is subsequently used by the authentication agent to send the authentication request and the metadata to the destination server.

5. The method of claim 1, wherein the method further comprises:

in response to receiving, from the destination server, an authentication token indicating that the authentication request is successful, sending the authentication token to the virtualized computing instance for subsequent communication between the client application and a server application supported by the destination server.

6. A non-transitory computer-readable storage medium that includes a set of instructions which, in response to execution by a processor of a host, cause the host including virtualization software to perform an authentication offload in a virtualized computing environment that includes the host and a destination server, comprising:

detecting, by the virtualization software, a packet from a virtualized computing instance and destined for the destination server at a virtual network interface controller (VNIC) associated with the virtualized computing instance, wherein the virtualized computing instance is one of multiple virtualized computing instances supported by the host, and the virtualization software maintains a mapping between underlying hardware resources of the host and virtual resources allocated to the virtualized computing instance;

in response to determination that the detected packet is an authentication request generated by a client application supported by the virtualized computing instance, obtaining, by the virtualization software from the virtualized computing instance, metadata associated with the client application for which authentication is requested, wherein the obtaining comprises based on header data of the authentication request, requesting the metadata from a guest operating system (OS) associated with the virtualized computing instance, and invoking a call supported by a guest enhancement toolkit installed on the guest OS, wherein the call identifies a source port number included in the authentication request, and the guest enhancement toolkit uses the source port number to identify the client application; and sending, by the virtualization software, the authentication request and the metadata to the destination server to cause the destination server to authenticate the client application based on the metadata; and in response to determination that the detected packet is not the authentication request, sending the detected packet to the destination server.

7. The non-transitory computer-readable storage medium of claim 6, wherein obtaining the metadata comprises:

receiving, from the guest enhancement toolkit, the metadata that includes one or more of the following: a hash value associated with the client application and a digital signature associated with the client application.

8. The non-transitory computer-readable storage medium of claim 6, wherein detecting the packet comprises:

performing packet snooping at the virtual network interface controller (VNIC) associated with the virtualized computing instance.

9. The non-transitory computer-readable storage medium of claim 6, including additional instructions which, in response to execution by the processor of the host, cause the host to perform:

establishing a trust channel between an authentication agent supported by the host and the destination server, wherein the trust channel is subsequently used by the authentication agent to send the authentication request and the metadata to the destination server.

10. The non-transitory computer-readable storage medium of claim 6, including additional instructions which, in response to execution by the processor of the host, cause the host to perform:

in response to receiving, from the destination server, an authentication token indicating that the authentication request is successful, sending the authentication token to the virtualized computing instance for subsequent communication between the client application and a server application supported by the destination server.

11. A host including virtualization software configured to perform authentication offload in a virtualized computing environment that includes the host and a destination server, wherein the host comprises:
  a processor; and
  a non-transitory computer-readable medium having stored thereon instructions that, when executed by the processor, cause the processor to:
  detect, by the virtualization software, a packet from a virtualized computing instance and destined for the destination server at a virtual network interface controller (VNIC) associated with the virtualized computing instance, wherein the virtualized computing instance is one of multiple virtualized computing instances supported by the host, and the virtualization software maintains a mapping between underlying hardware resources of the host and virtual resources allocated to the virtualized computing instance;
  in response to determination that the detected packet is an authentication request generated by a client application supported by the virtualized computing instance,
    obtain, by the virtualization software from the virtualized computing instance, metadata associated with the client application for which authentication is requested, wherein the instructions for obtaining the metadata cause the processor to
    based on header data of the authentication request, request the metadata from a guest operating system (OS) associated with the virtualized computing instance, and
    invoke a call supported by a guest enhancement toolkit installed on the guest OS, wherein the call identifies a source port number included in the authentication request, and the guest enhancement toolkit uses the source port number to identify the client application; and
  send, by the virtualization software the authentication request and the metadata to the destination server to cause the destination server to authenticate the client application based on the metadata; and
  in response to determination that the detected packet is not the authentication request, sending the detected packet to the destination server.

12. The host of claim 11, wherein the instructions for obtaining the metadata cause the processor to:
  receive, from the guest enhancement toolkit, the metadata that includes one or more of the following: a hash value associated with the client application and a digital signature associated with the client application.

13. The host of claim 11, wherein the instructions for detecting the packet cause the processor to:
  perform packet snooping at the virtual network interface controller (VNIC) associated with the virtualized computing instance.

14. The host of claim 11, wherein the instructions further cause the processor to:
  establish a trust channel between an authentication agent supported by the host and the destination server, wherein the trust channel is subsequently used by the authentication agent to send the authentication request and the metadata to the destination server.

15. The host of claim 11, wherein the instructions further cause the processor to:
  in response to receiving, from the destination server, an authentication token indicating that the authentication request is successful, send the authentication token to the virtualized computing instance for subsequent communication between the client application and a server application supported by the destination server.

* * * * *